E. G. MORSE.
APPARATUS FOR DRYING FOODSTUFFS.
APPLICATION FILED SEPT. 7, 1917.
1,270,540.
Patented June 25, 1918.
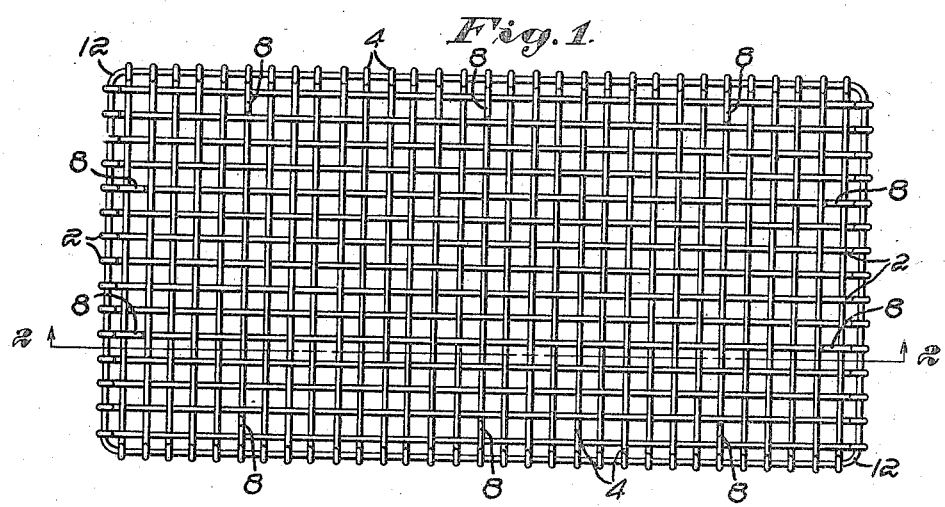
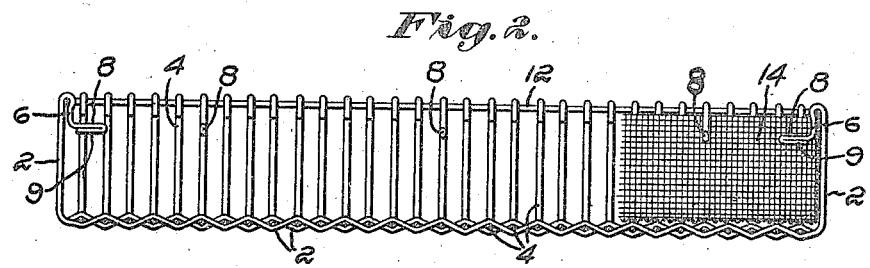
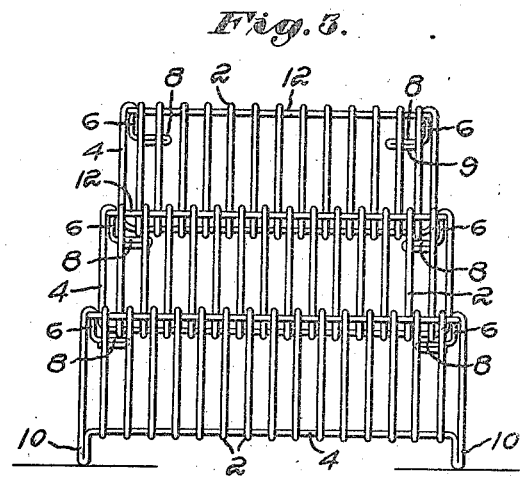
Inventor:
Elizabeth G. Morse,
by Emery, Booth, Janney & Varney,
Attys.

UNITED STATES PATENT OFFICE.

ELIZABETH G. MORSE, OF READING, MASSACHUSETTS.

APPARATUS FOR DRYING FOODSTUFFS.

1,270,540. Specification of Letters Patent. Patented June 25, 1918.

Application filed September 7, 1917. Serial No. 190,258.

*To all whom it may concern:*

Be it known that I, ELIZABETH G. MORSE, a citizen of the United States, and a resident of Reading, county of Middlesex, and State of Massachusetts, (whose post-office address is 7 Fremont street, Reading, Massachusetts,) have invented an Improvement in Apparatus for Drying Foodstuffs, of which the following description, in connection with the accompanying drawings, is a specification, like characters on the drawings representing like parts.

This invention relates to drying apparatus or appliances and more particularly to apparatus or appliances for drying vegetables, fruits or other foodstuffs to preserve the same and enable them to be kept and used as desired.

The objects and features of the invention will be best understood from the following description, taken in connection with the accompanying drawings, of an apparatus or appliance embodying one form of said invention selected for the purpose of illustration, the invention in its true scope being definitely set forth by the appended claims.

In the drawings:

Figure 1 is a plan view of one embodiment of the invention;

Fig. 2 is a longitudinal section on line 2—2 of Fig. 1;

Fig. 3 shows, in end elevation, several receptacles superposed or nested in accordance with the present invention.

The invention comprises a receptacle in which the articles or material to be dried are placed, said receptacle being preferably so constructed as to allow free access of the air to said articles. Any suitable construction may be adopted for this purpose in accordance with the invention, and in the illustrative example shown, said receptacle will preferably be constructed of wire, the wires herein extending longitudinally and transversely, as shown at 2 and 4, to form the bottom and sides of the receptacle, the longitudinal and transverse wires being preferably interwoven where they cross each other in the bottom of the receptacle.

One feature of the invention consists in providing means whereby a plurality of the receptacles may be superposed or nested, as shown in Fig. 4. Any suitable means may be adopted for this purpose, a very simple arrangement being that herein shown, wherein both end portions of a plurality of the wires are bent inwardly and downwardly, as shown at 6, in close proximity to the side of the receptacle, and then horizontally inward away from said side, as shown at 8, the free ends of the wire being then preferably turned under, as shown at 9. The remainder of the wires have their ends simply bent down as shown.

The inwardly projecting horizontal portions 8 of the wires thus form a support upon which to rest a receptacle of slightly less length or width. Herein three of the transverse wires are thus bent to provide the supporting portions 8, and two of the longitudinal wires, suitably spaced wires being selected for this purpose. It will be apparent that the number of wires provided with portions 8 may be varied as desired. By providing a plurality of receptacles of decreasing length and width, they may be superposed or nested, as shown in Fig. 3, and thus furnish a very simple, efficient and capacious drying apparatus, occupying little floor space in comparison to its capacity.

If desired, the lower section may be provided with legs 10, as shown in Fig. 3, one at each corner, for example, to raise the bottom of the receptacle from the surface by which it is supported, thus allowing free access of the air from below to the interior of the receptacle.

If desired, a wire 12 may extend around the upper edge of the receptacle to act as a brace and give added rigidity.

The wires forming the receptacle may be variously spaced as best suited to the use to which the receptacle is to be applied. Where the vegetables, fruits or other articles to be dried are of so small a size as to require it, a lining 14 of smaller mesh, of any suitable material, such as wire netting, may be used as shown. As seen in Fig. 2, the edge of the lining 14 is held in place by the downturned portion 6 of the wires which thus serve a double function in holding such lining and in providing for the support of a superposed receptacle.

In use, the vegetables, fruits or other articles to be dried are placed in the receptacle, preferably in a single layer upon the bottom thereof, and the receptacle, or a plurality thereof in nested relation, with the articles placed therein as described, may then be placed in any suitable heated space, such as an ordinary oven for example, or upon a coal, gas or electric range, and the articles thus dried, care being taken to maintain the temperature sufficiently low to prevent cooking of the articles. In the case of a gas range, a plate of sheet iron or the like will preferably be interposed between the receptacle and the flames. Preferably provision will be made to allow access of the air to the heated space. In the case of an ordinary oven this may be provided for by leaving the door partly open.

The drying may also be effected by placing the receptacle or receptacles with their contents in the open air, preferably in the sun. In such case, mosquito netting or any other suitable means should be used to protect the articles from flies and other insects.

My invention presents many advantages over receptacles having solid walls, such as receptacles made from sheet metal, for example, in that in my apparatus the air has free access from all sides to the material to be dried, thus greatly facilitating and expediting the drying operation, and the articles dried retain practically all their natural juices and are much less liable to become partially cooked, as is very liable to occur where receptacles having solid walls are used, and artificial heat is applied in carrying out the drying operation. Several kinds of fruit and vegetables may be dried in my apparatus simultaneously, each retaining its own flavor, without danger of different flavors blending.

Apparatus constructed in accordance with my invention is easily manufactured at low cost, is extremely efficient in operation, the drying being effected in much less time than in any other apparatus that I am aware of, and requires no experience whatever or special knowledge for its successful operation. The apparatus is also very easily cleaned.

Other advantages resulting from my described invention, in addition to those pointed out, will appear to those skilled in the art.

It will be apparent that while the invention is herein described as embodied in the details illustrated, the invention is not to be considered as circumscribed by or limited to these details, or any of them, but that the said details may be variously modified within the true scope of the invention which is definitely set forth by the claims.

Claims.

1. As an article of manufacture, a receptacle for drying vegetables, fruits or other food stuffs, said receptacle being formed of longitudinally and transversely extending wires bent to form the bottom and sides of said receptacle, said transverse and longitudinal wires being interlaced where they form the bottom of the receptacle and a plurality being bent inwardly at the edges of said receptacle to furnish supporting means for a receptacle of smaller size.

2. As an article of manufacture, a receptacle for drying vegetables, fruits or other food stuffs and formed of longitudinally and transversely extending wires bent to form the bottom and sides of said receptacle, the free ends of a plurality of said wires being bent downwardly and then inwardly at the edges of said receptacle to furnish supporting means for another receptacle, and said first-named receptacle being lined with wire netting.

3. As an article of manufacture, a receptacle for drying vegetables, fruits or other food stuffs and formed of longitudinally and transversely extending wires bent to form the bottom and sides of said receptacle, the free ends of a plurality of said wires being bent downwardly and then inwardly at the edges of said receptacle to furnish supporting means for another receptacle, and means to brace said wires and keep them in spaced relation along the edges of said receptacle.

In testimony whereof, I have signed my name to this specification.

ELIZABETH G. MORSE.

Copies of this patent may be obtained for five cents each, by addressing the "Commissioner of Patents. Washington, D. C."